(12) United States Patent
Tani

(10) Patent No.: US 6,826,705 B2
(45) Date of Patent: Nov. 30, 2004

(54) POWER CONTROL DEVICE FOR PROCESSOR

(75) Inventor: Takenobu Tani, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 545 days.

(21) Appl. No.: 10/003,533

(22) Filed: Dec. 6, 2001

(65) Prior Publication Data

US 2002/0073348 A1 Jun. 13, 2002

(30) Foreign Application Priority Data

Dec. 13, 2000 (JP) ........................................ 2000-378752

(51) Int. Cl.⁷ ................................................ G06F 1/26
(52) U.S. Cl. ...................... 713/320; 713/300; 713/323; 713/328; 713/340
(58) Field of Search ................................ 713/320, 322, 713/323, 328, 340, 300

(56) References Cited

U.S. PATENT DOCUMENTS

| 5,532,945 | A | * | 7/1996 | Robinson | .................... | 713/321 |
| 5,832,280 | A | * | 11/1998 | Swanberg | ................... | 713/300 |
| 5,903,476 | A | * | 5/1999 | Mauskar et al. | ................ | 716/1 |
| 5,991,889 | A |  | 11/1999 | Hikichi et al. |  |  |
| 5,996,083 | A |  | 11/1999 | Gupta et al. |  |  |
| 6,125,449 | A | * | 9/2000 | Taylor et al. | ................ | 713/310 |
| 6,138,232 | A | * | 10/2000 | Shiell et al. | ................ | 712/244 |
| 6,286,107 | B1 | * | 9/2001 | Tamaki et al. | ............... | 713/320 |

FOREIGN PATENT DOCUMENTS

| JP | 05150872 | 6/1993 |
| JP | 07-295693 | 11/1995 |
| JP | 08211960 | 8/1996 |
| JP | 08314587 | 11/1996 |

* cited by examiner

Primary Examiner—A. Elamin
(74) Attorney, Agent, or Firm—McDermott Will & Emery LLP

(57) ABSTRACT

A processor has: a power table including a plurality of power control registers each rewritably storing power control information; a condition determiner for rewritably storing a plurality of operating conditions (e.g., a comparison address to be compared with the program counter) and determining which one of the plurality of operating conditions is satisfied by a current operation of the processor so as to supply an index signal to select one of the plurality of power control registers based on the determination; and a voltage/clock controller for controlling the power consumption in a control object circuit block according to the power control information in one of the power control registers that is selected by the index signal.

12 Claims, 13 Drawing Sheets

POWER CONTROL DEVICE FOR PROCESSOR

BACKGROUND OF THE INVENTION

The present invention relates to a power control device for controlling the amount of power to be consumed in a processor.

Computers, microprocessors, microcontrollers, digital signal processors (DSPs), etc., are known in the art. Herein, these stored program type devices are referred to generally as "processors".

Some conventional processors include a power control device. For example, a power control device for a processor lowers the frequency of the internal clock of the processor to a lower frequency in the stand-by mode, thereby reducing the power consumption.

With the conventional power control device for a processor, however, the lower clock frequency cannot be determined by the user of the processor. Moreover, the stand-by mode is selected through execution of a special instruction by the processor, thereby increasing the size of the program.

SUMMARY OF THE INVENTION

An object of the present invention is to allow the user to finely define the low power mode operation of a processor.

Another object of the present invention is to provide a power control device of an event-driven type, thereby reducing the programming load.

In order to achieve these objects, the present invention provides a power control device for controlling the amount of power to be consumed in a processor, the power control device including: a power table including a plurality of power control registers each rewritably storing power control information; a condition determiner for rewritably storing a plurality of operating conditions and determining which one of the plurality of operating conditions is satisfied by a current operation of the processor so as to supply an index signal to select one of the plurality of power control registers based on the determination; and a controller for controlling the power consumption in the processor according to the power control information in one of the power control registers that is selected by the index signal.

With the power control device of the present invention, the user is allowed to rewrite the power control information and the operating conditions before or while the program is executed so as to finely define the low power mode operation of the processor. The rewrite operation can be done when the processor is manufactured.

In the power control device of the present invention, the current condition of the processor is automatically determined by the condition determiner. Therefore, it is possible to realize an event-driven type power control device by using, as an input to the condition determiner, an address indicated by the program counter of the processor, the type of an event that has occurred in the processor, the time indicated by the time signal from the processor, etc.

DETAILED DESCRIPTION OF THE INVENTION

Specific applications of the present invention to a microprocessor will now be described with reference to the drawings.

First Embodiment

Figure 1:
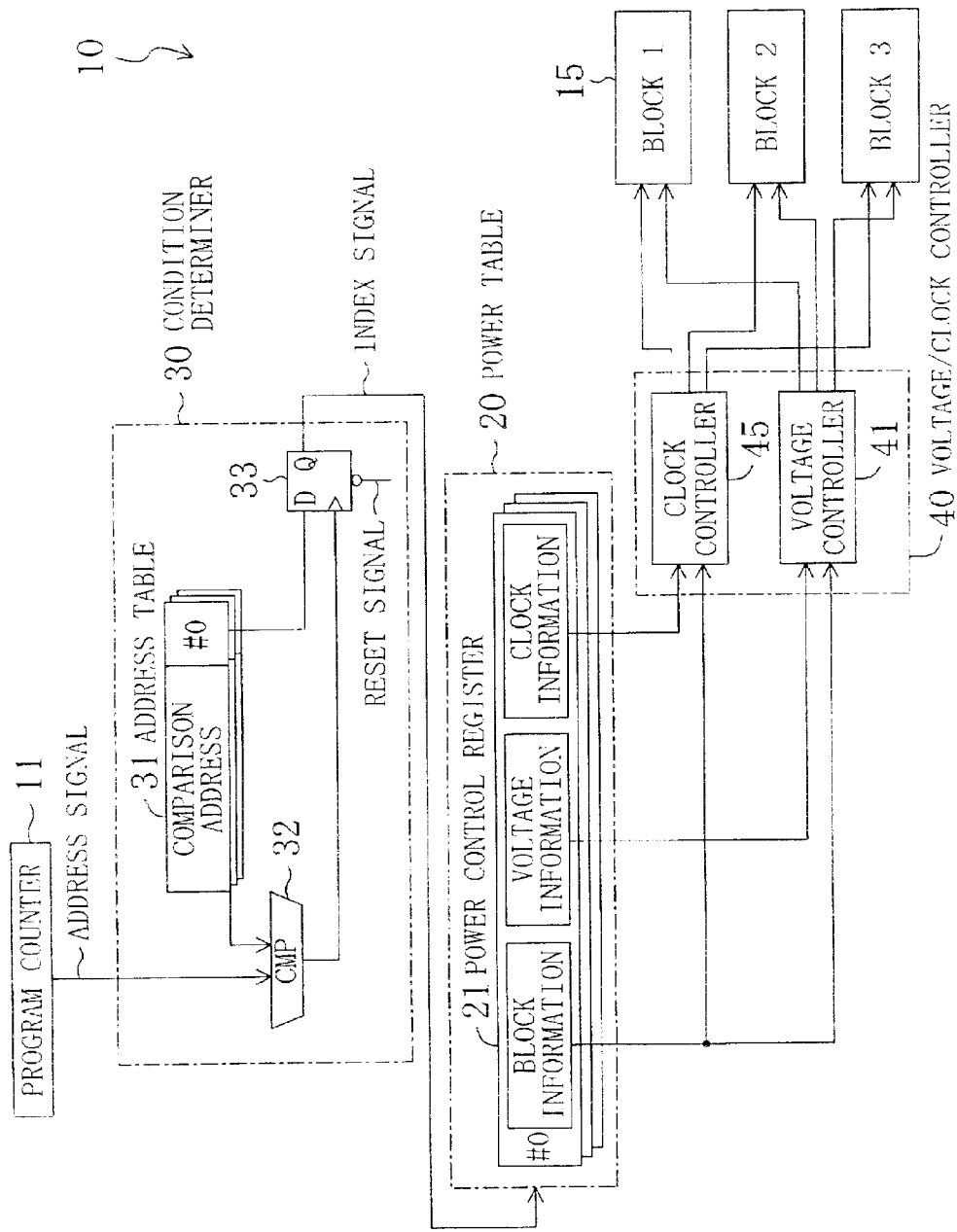
FIG. 1 is a block diagram illustrating a power control device for a microprocessor according to a first embodiment of the present invention.

FIG. 1 illustrates a power control device for a microprocessor 10 according to a first embodiment of the present invention. The microprocessor 10 includes a program counter 11, a plurality of circuit blocks 15 and a power control device. The power control device includes a power table 20, a condition determiner 30 and a voltage/clock controller 40.

The power table 20 includes a plurality of power control registers 21 each rewritably storing power control information. Each power control information includes block information specifying one or more of the plurality of circuit blocks 15 to be subjected to a power control, information regarding the voltage of a control object block (voltage information), and information regarding the clock to be supplied to a control object block (clock information). One of the plurality of power control registers 21 is selected by an index signal supplied from the condition determiner 30.

The voltage/clock controller 40 is a controller for controlling the power consumption of a control object circuit block according to the power control information in the power control register 21 that is selected by the index signal. The voltage/clock controller 40 includes a voltage controller 41 for receiving the block information and the voltage information, and a clock controller 45 for receiving the block information and the clock information.

The condition determiner 30 includes an address table 31, a comparator 32 and a latch 33. The address table 31 includes a plurality of registers each rewritably storing a comparison address and an index number associated with the comparison address. The comparator 32 determines which one of the plurality of comparison addresses in the address table 31 matches the address indicated by the program counter 11. The latch 33 holds the index number associated with the comparison address that has been determined to be a match, and supplies a signal representing the index number to the power table 20 as the index signal.

Figure 2:
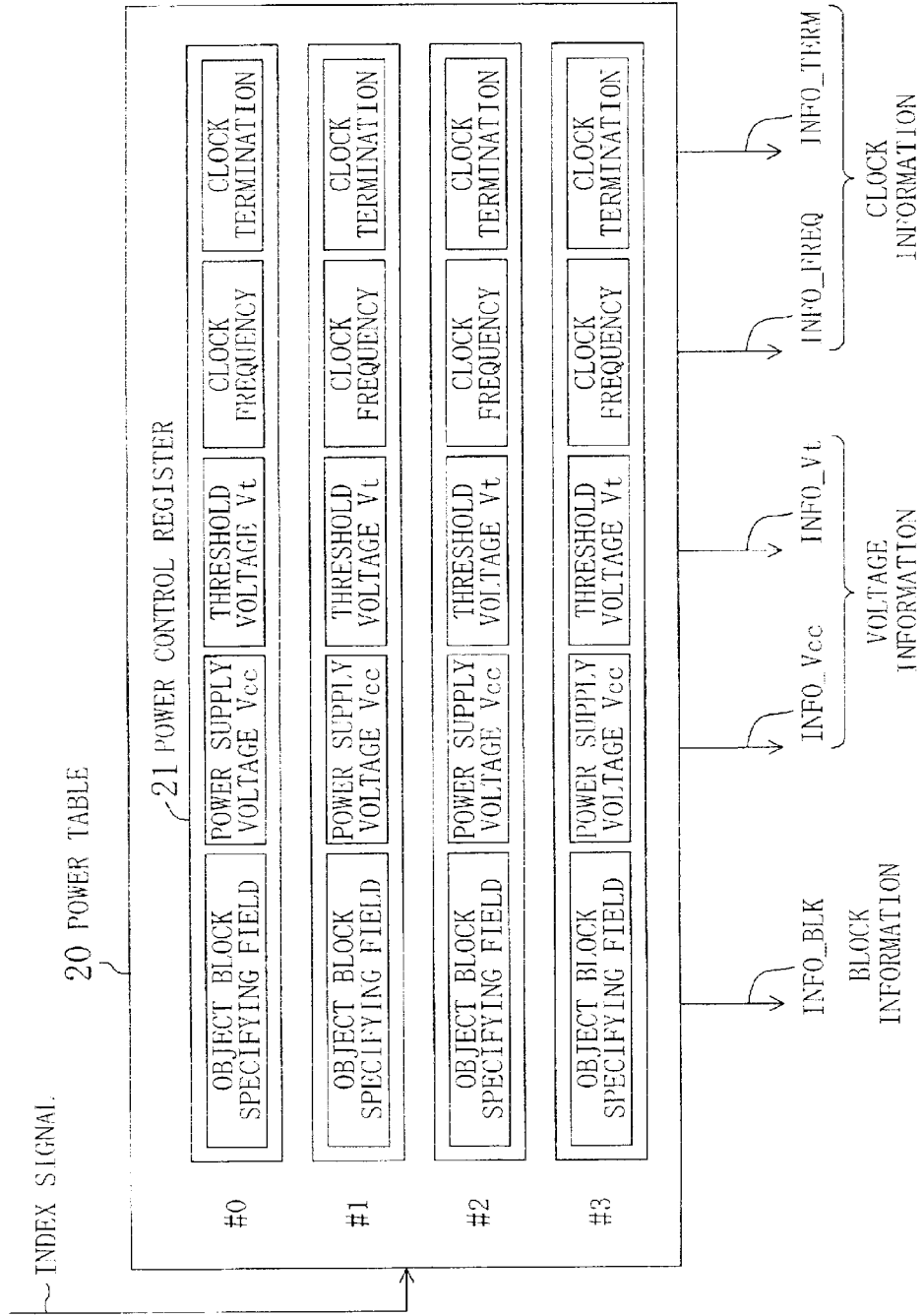
FIG. 2 is a block diagram illustrating a specific example of a power table in FIG. 1.

FIG. 2 illustrates a specific example of the power table 20 in FIG. 1. Each power control register 21 includes an object block specifying field, first and second voltage specifying fields, and first and second clock specifying fields. The object block specifying field has a plurality of bits corresponding respectively to the plurality of circuit blocks 15. For example, a bit value "1" indicates that the corresponding circuit block is to be the object of a power control. The information of the object block specifying field is supplied to the voltage controller 41 and the clock controller 45 as block information (INFO_BLK). The first voltage specifying field is a field for storing first voltage information (INFO_Vcc) that represents the magnitude of a power supply voltage Vcc to be supplied to the control object circuit block. The second voltage specifying field is a field for storing second voltage information (INFO_Vt) used for controlling a threshold voltage Vt of each transistor of the control object circuit block. The first clock specifying field is a field for storing first clock information (INFO_FREQ) that represents the frequency of the clock to be supplied to the control object circuit block. The second clock specifying field is a field for storing second clock information (INFO_TERM) that represents whether or not to terminate the supply of the clock to the control object circuit block. The voltage information and the clock information are supplied to the voltage controller 41 and the clock controller 45, respectively.

Figure 3:
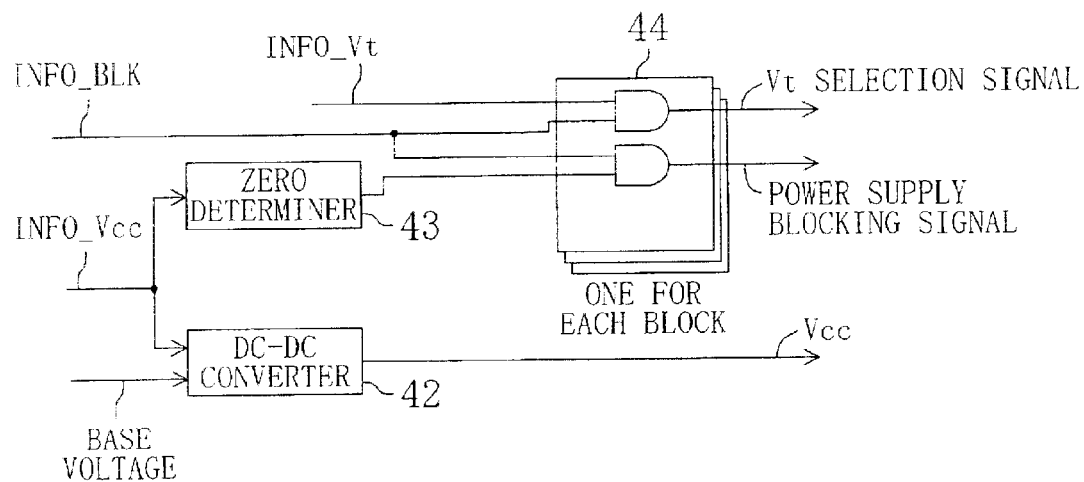
FIG. 3 is a block diagram illustrating a specific example of a voltage controller in FIG. 1.

FIG. 3 illustrates a specific example of the voltage controller 41 in FIG. 1. The voltage controller 41 of FIG. 3 includes a DC-DC converter 42, a zero determiner 43, and a logic circuit 44 provided for each block. The DC-DC converter 42 converts a base voltage to a voltage of a magnitude that is specified by the first voltage information (INFO_Vcc), and outputs the converted voltage as a power supply voltage Vcc. The zero determiner 43 determines whether or not zero is specified by the first voltage information (INFO_Vcc). Each logic circuit 44 includes two AND gates, and outputs a power supply blocking signal and a Vt selection signal. The power supply blocking signal is based on the block information (INFO_BLK) and the output of the zero determiner 43, and the Vt selection signal is based on the block information (INFO_BLK) and the second voltage information (INFO_Vt). The power supply blocking signal is used for controlling the power supply voltage Vcc supply switch in the control object circuit block. The Vt selection signal is used for selecting a back gate voltage of a MOS transistor, for example, so as to control the threshold voltage Vt of each transistor of the control object circuit block. The power consumption of each circuit block is proportional to the square of the power supply voltage Vcc. Therefore, a reduction in the power supply voltage Vcc quite significantly contributes to reducing the power consumption of the circuit block. Moreover, by controlling the transistor threshold voltage Vt, it is possible to realize a high speed operation mode of the transistor and a non-operating mode thereof in which a leak current is reduced.

Figure 4:
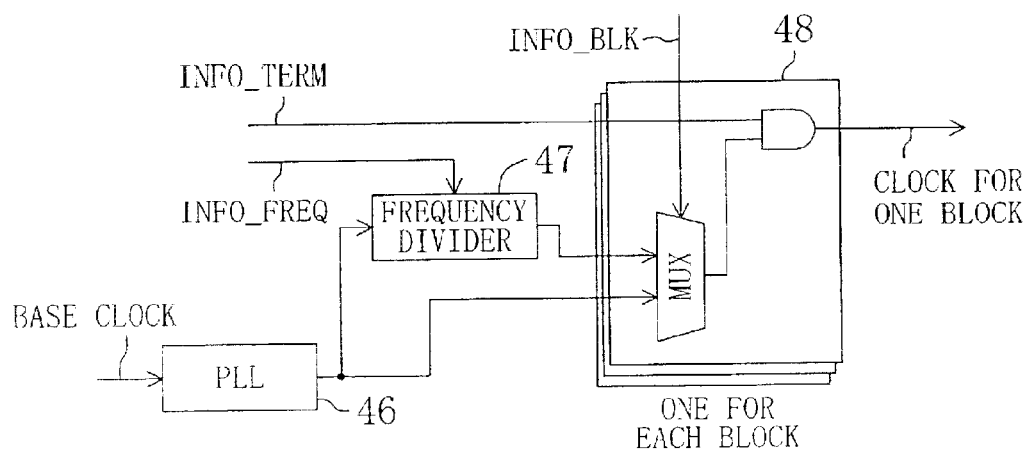
FIG. 4 is a block diagram illustrating a specific example of a clock controller in FIG. 1.

FIG. 4 illustrates a specific example of the clock controller 45 in FIG. 1. The clock controller 45 of FIG. 4 includes a PLL 46, a frequency divider 47, and a logic circuit 48 provided for each block. The PLL 46 generates, from a base clock, an internal clock for a normal operation that has a particular frequency. The frequency divider 47 divides the internal clock with a frequency dividing ratio according to the clock frequency that is specified by the first clock information (INFO_FREQ). The logic circuit 48, including one multiplexer and one AND gate, selects either one of the internal clock supplied from the PLL 46 and the frequency-divided clock supplied from the frequency divider 47 based on the block information (INFO_BLK), and controls supply/termination of the selected clock based on the second clock information (INFO_TERM). The power consumption of each circuit block is proportional to the clock frequency. Therefore, a reduction in the clock frequency significantly contributes to reducing the power consumption of a circuit block that is not required to operate at a high speed.

Figure 5:
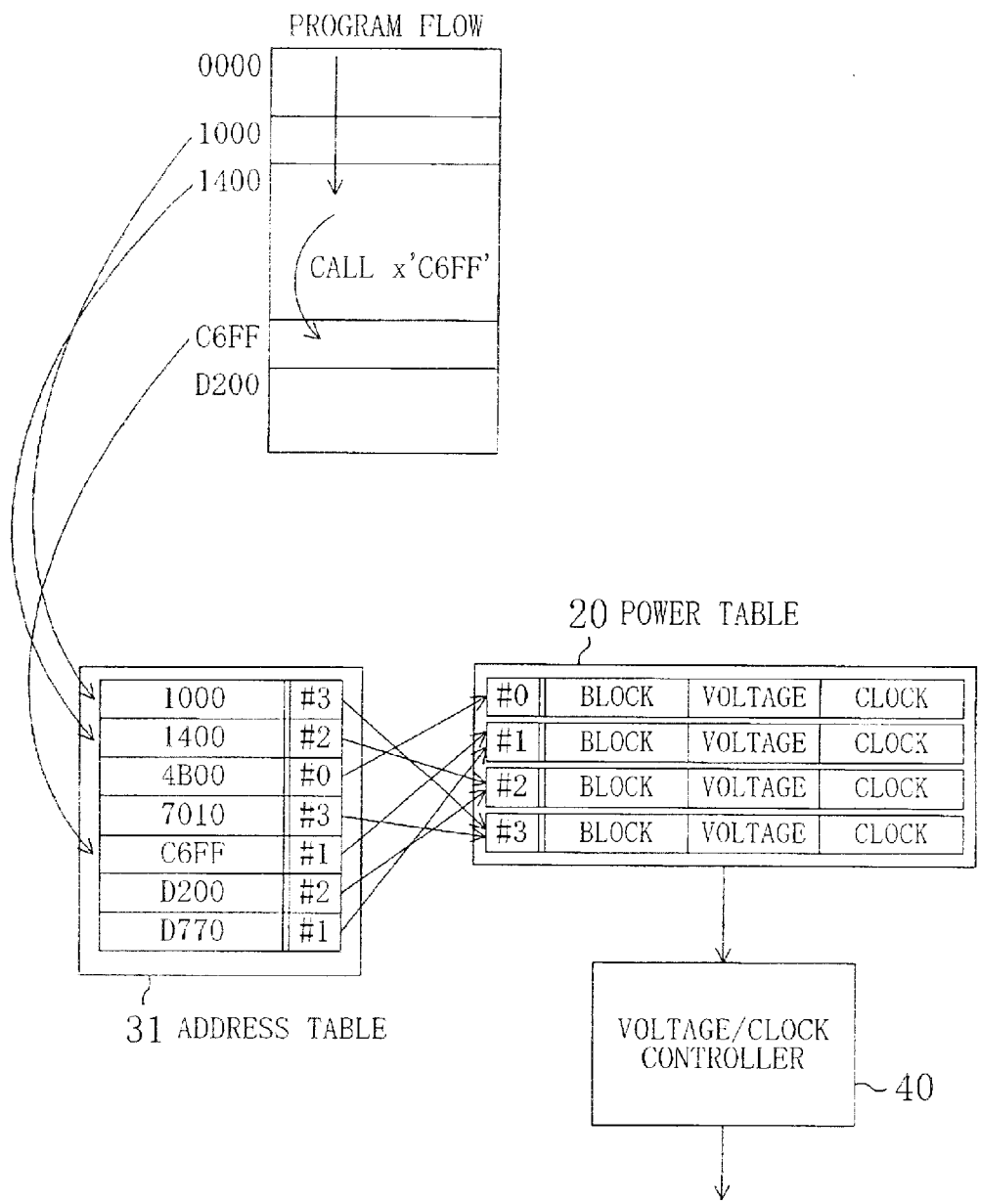
FIG. 5 is a conceptual diagram illustrating an example of an operation performed by the power control device of FIG. 1.

FIG. 5 conceptually illustrates an example of an operation performed by the power control device of FIG. 1. In FIG. 5, the power table 20 includes four power control registers that are identified by respective index numbers 0, 1, 2 and 3. The address table 31 stores the pair of comparison address 1000 and index number 3, the pair of comparison address 1400 and index number 2, the pair of comparison address 4B00 and index number 0, the pair of comparison address 7010 and index number 3, the pair of comparison address C6FF and index number 1, the pair of comparison address D200 and index number 2, and the pair of comparison address D770 and index number 1.

The operation illustrated in FIG. 5 realizes the following power control according to the program flow of the microprocessor 10. First, the execution of the program starts at address 0000. Then, when the instruction at address 1000 is executed, the address indicated by the program counter 11 matches the first comparison address in the address table 31. Thus, an index signal representing number 3 is supplied to the power table 20. Upon receipt of the index signal, the power table 20 supplies power control information that is specified by index number 3 to the voltage/clock controller 40, and the voltage/clock controller 40 performs a power control and a clock control according to the power control information. Then, when the execution of the program reaches address 1400, the address indicated by the program counter 11 matches the second comparison address in the address table 31, whereby an index signal representing number 2 is supplied to the power table 20. Upon receipt of the index signal, the power table 20 supplies power control information that is specified by index number 2 to the voltage/clock controller 40, and the voltage/clock controller 40 performs a power control and a clock control according to the power control information. Then, when a subroutine call instruction to branch off to address C6FF is executed, the address indicated by the program counter 11 matches the fifth comparison address in the address table 31, whereby an index signal representing number 1 is supplied to the power table 20. Upon receipt of the index signal, the power table 20 supplies power control information that is specified by index number 1 to the voltage/clock controller 40, and the voltage/clock controller 40 performs a power control and a clock control according to the power control information.

As described above, with the power control device of FIG. 1, the user is allowed to rewrite the power table 20 and the address table 31 as desired so as to finely define the low power mode operation of the microprocessor 10. A power control operation can be performed frequently, e.g., on a subroutine-by-subroutine basis, or on an instruction-by-instruction basis. Alternatively, a power control operation can be performed only when executing instructions within a specified address range, or only when executing certain instruction(s) within a nested loop. Moreover, it is not necessary to execute a special instruction for such a power control, whereby the power control will not reduce the processing efficiency of an application program itself or increase the instruction memory capacity. Furthermore, with the power control device of FIG. 1, an application program can be developed independently of the power control design. Therefore, it is possible to improve the program development efficiency and the maintainability. Moreover, it is possible to realize a detailed power control without modifying the existing application programs.

Figure 6:
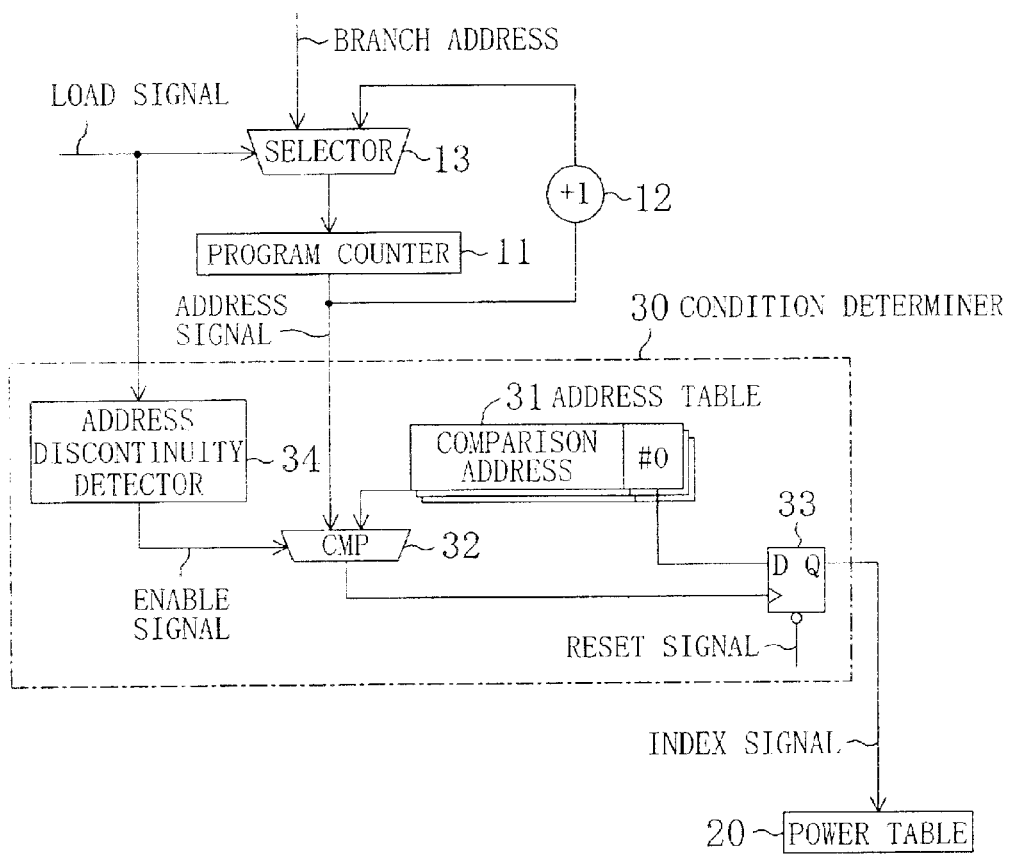
FIG. 6 is a block diagram illustrating a variation of a condition determiner in FIG. 1.

FIG. 6 illustrates a variation of the condition determiner 30 in FIG. 1. Referring to FIG. 6, an incrementer 12 and a selector 13 are provided for updating the program counter 11. The incrementer 12 receives an output address signal from the program counter 11, and increments the address. The selector 13 is designed so that it normally supplies the output address of the incrementer 12 to the program counter 11, while it supplies a branch address to the program counter 11 when a load signal is received. The condition determiner 30 of FIG. 6 includes an address discontinuity detector 34 for receiving a load signal and generating an enable signal, in addition to the address table 31, the comparator 32 and the latch 33. The comparator 32 is controlled by the enable signal so as to perform an address match determination only when a discontinuous change is detected in the address indicated by the program counter 11. As a result, the power consumption in the condition determiner 30 is reduced from that in the case of FIG. 1.

Figure 7:
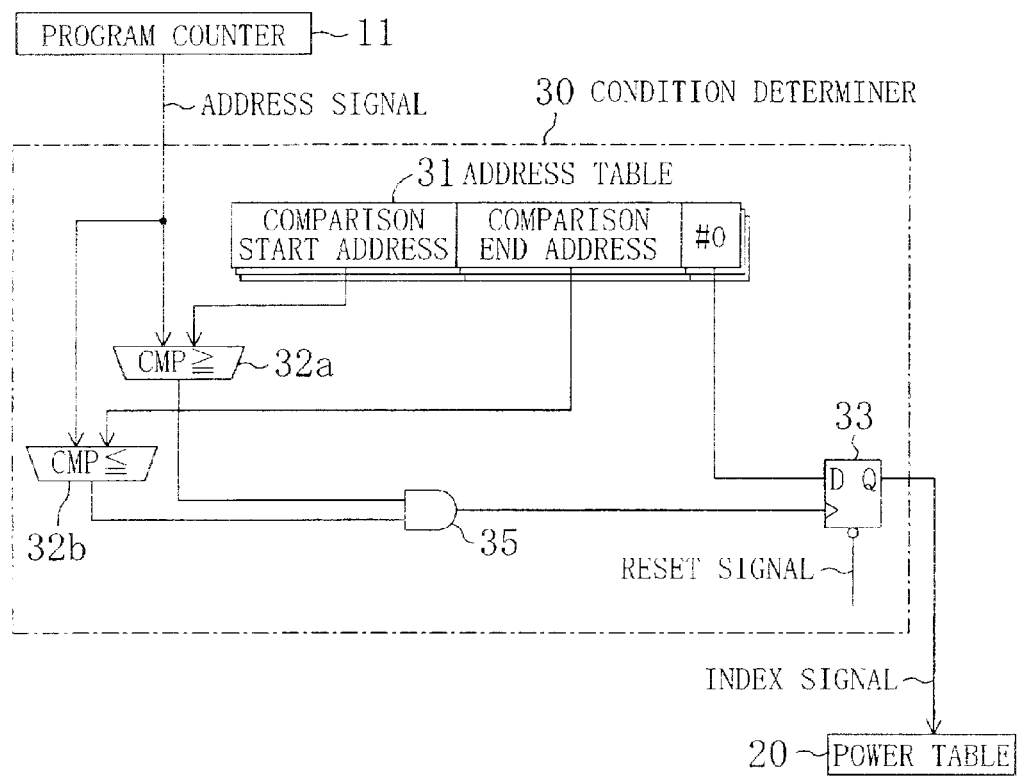
FIG. 7 is a block diagram illustrating another variation of the condition determiner in FIG. 1.

FIG. 7 illustrates another variation of the condition determiner 30 in FIG. 1. The condition determiner 30 of FIG. 7 is suitable for a power control performed on a subroutine-by-subroutine basis, for example. The address table 31 of the condition determiner 30 includes a plurality of registers each rewritably storing a comparison start address, a comparison end address associated with the comparison start address, and an index number associated with the comparison start address and the comparison end address. The condition determiner 30 determines one of a plurality of address ranges each defined by one of the comparison start addresses and one of the comparison end addresses to which the address indicated by the program counter 11 belongs to, and outputs, to the power table 20 as an index signal, a signal representing the index number that is associated with the comparison start address and the comparison end address defining the address range that has been determined to include the indicated address. For such an operation, the condition determiner 30 of FIG. 7 includes a first comparator 32a, a second comparator 32b, an AND gate 35 and a latch 33, in addition to the address table 31. An address range determination over a greater range than that in the case of FIG. 7 can be realized by performing a match determination at the comparator 32 in FIG. 1 with only one or more upper bits of the address.

Second Embodiment

Figure 8:
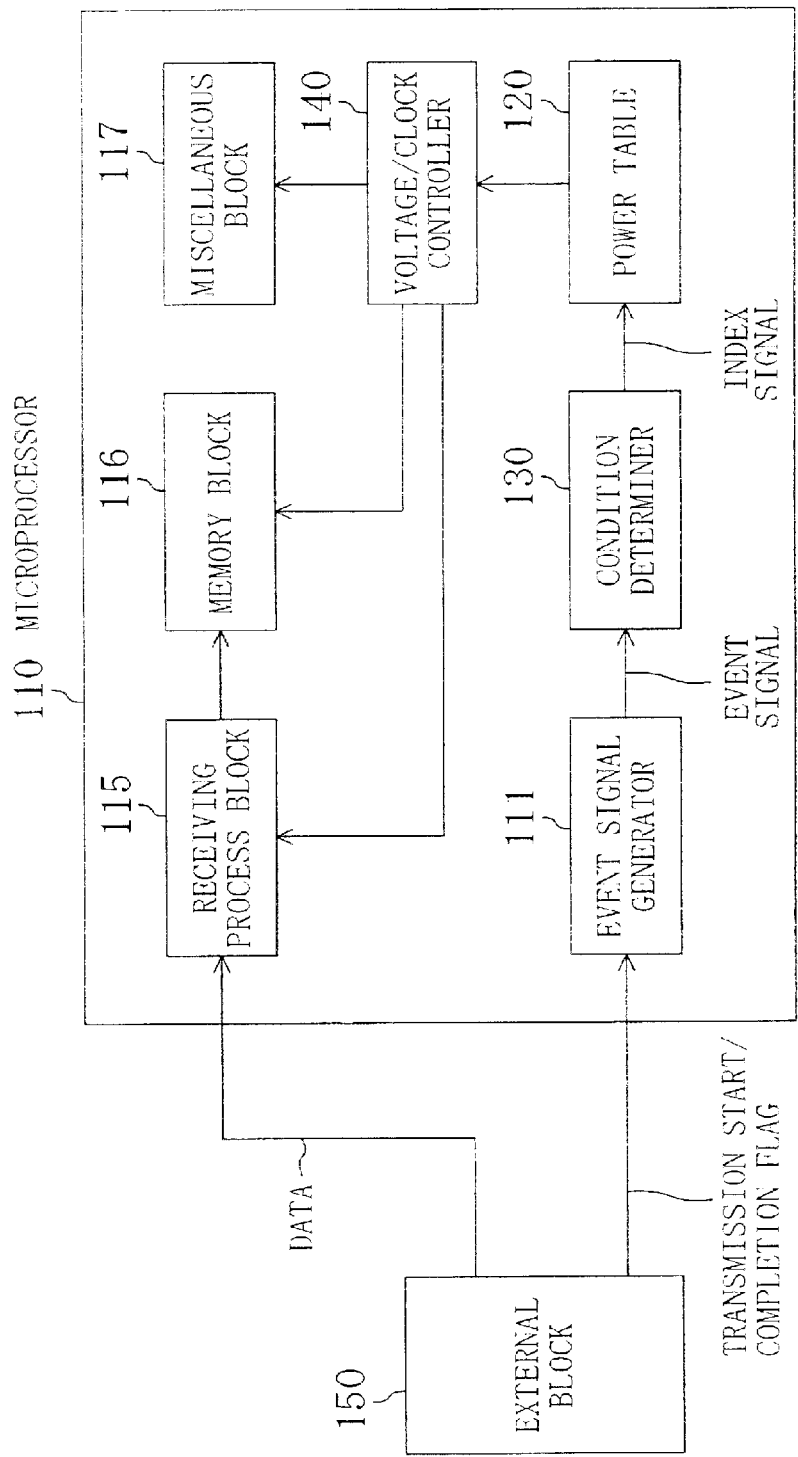
FIG. 8 is a block diagram illustrating a microprocessor including a power control device according to a second embodiment of the present invention.

FIG. 8 illustrates a microprocessor 110 including a power control device according to a second embodiment of the present invention. The microprocessor 110 of FIG. 8 has a function of receiving a burst of data from an external block 150 as an interrupt process based on a transmission start/completion flag that is provided from the external block 150. The microprocessor 110 includes an event signal generator 111 for generating an event signal representing an interrupt type (event type) according to the transmission start/completion flag, etc., a receiving process block 115 for receiving data, a memory block 116 for storing received data, and a miscellaneous function block 117. The microprocessor 110 of FIG. 8 further includes a power table 120 similar to the power table 20 in FIG. 1, a condition determiner 130 for supplying an index signal to the power table 120 in response to an event signal, and a voltage/clock controller 140 similar to the voltage/clock controller 40 in FIG. 1, which together form a power control device for controlling the power consumption of the circuit blocks 115, 116 and 117.

Figure 9:
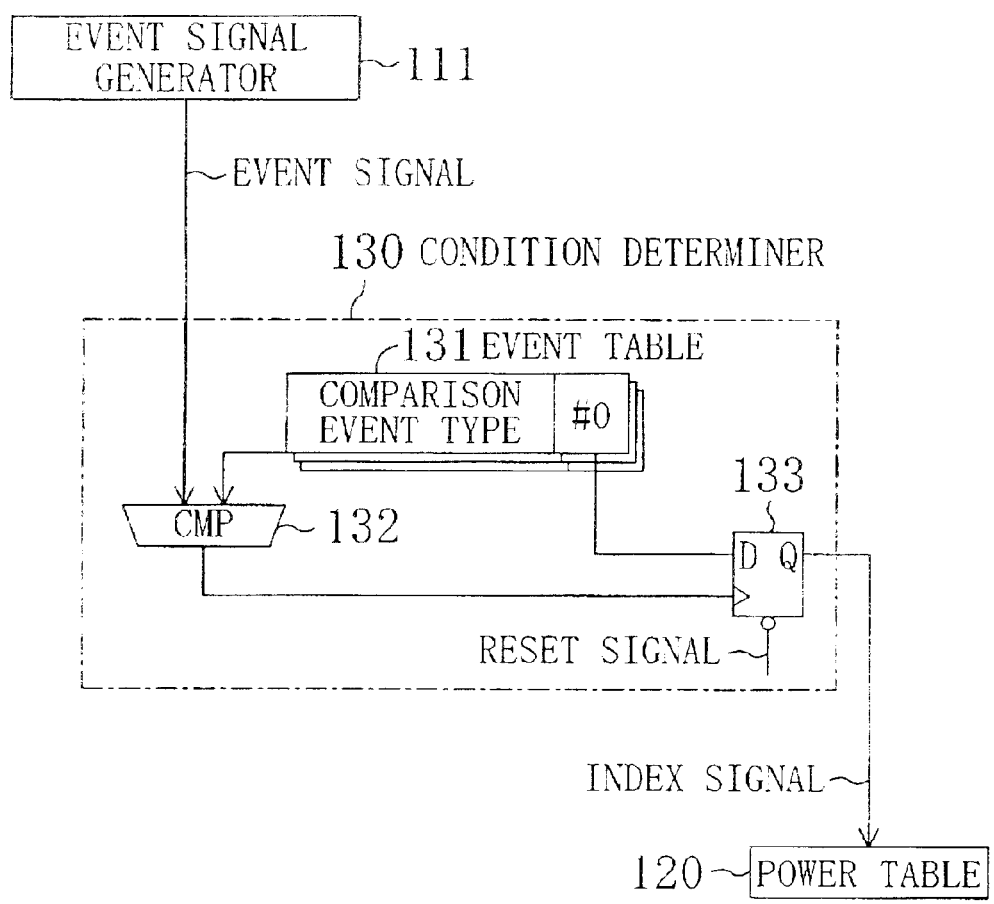
FIG. 9 is a block diagram illustrating a specific example of a condition determiner in FIG. 8.

FIG. 9 illustrates a specific example of the condition determiner 130 in FIG. 8. The condition determiner 130 of FIG. 9 includes an event table 131, a comparator 132 and a latch 133. The event table 131 includes a plurality of registers each rewritably storing a comparison event type and an index number associated with the comparison event type. The comparator 132 determines which one of the plurality of comparison event types in the event table 131 matches the event type represented by the event signal generated by the event signal generator 111. The latch 133 holds the index number associated with the comparison event type that has been determined to be a match, and supplies a signal representing the index number to the power table 120 as the index signal.

Figure 10:
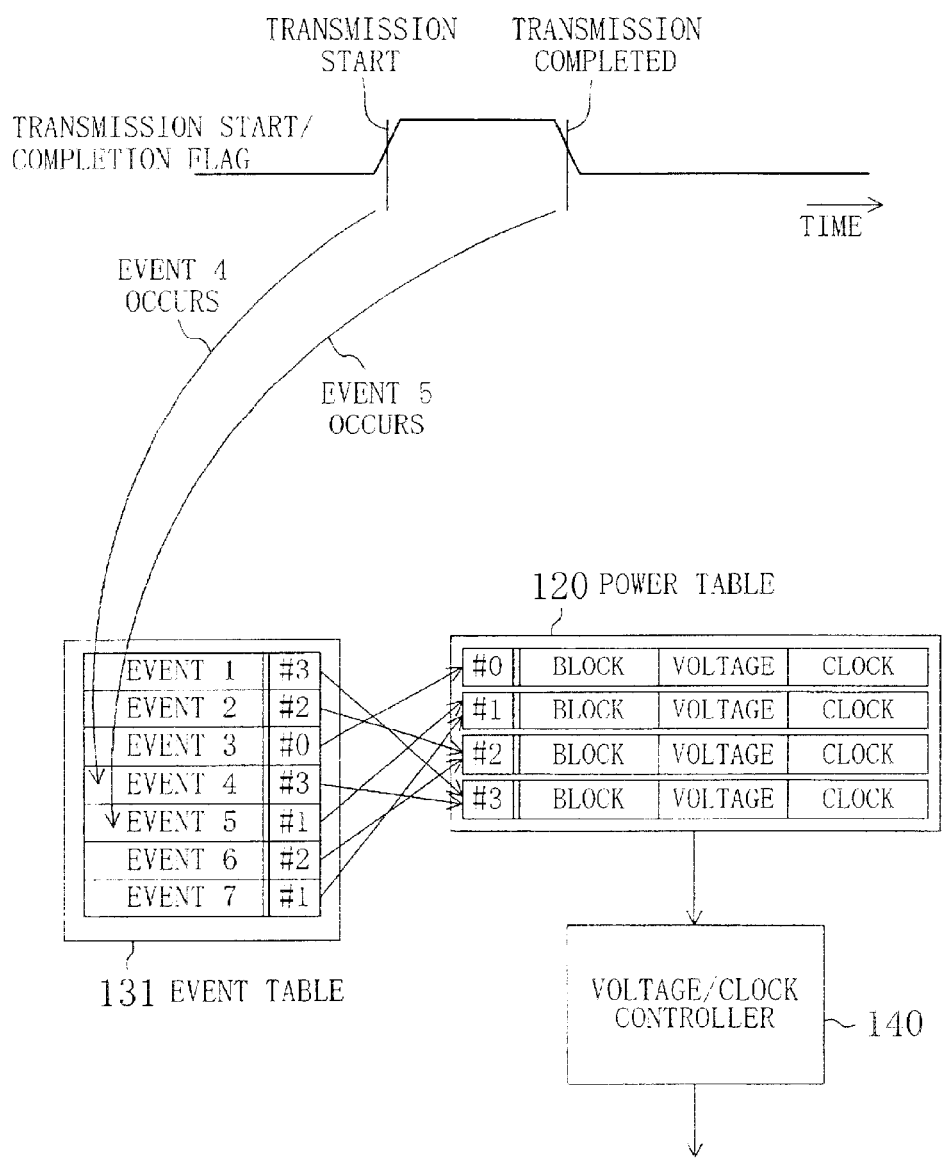
FIG. 10 is a conceptual diagram illustrating an example of an operation performed by the power control device of FIG. 8.

FIG. 10 conceptually illustrates an example of an operation performed by the power control device of FIG. 8. In FIG. 10, the power table 120 includes four power control registers that are identified by respective index numbers 0, 1, 2 and 3. The event table 131 stores the pair of comparison event type 1 and index number 3, the pair of comparison event type 2 and index number 2, the pair of comparison event type 3 and index number 0, the pair of comparison event type 4 and index number 3, the pair of comparison event type 5 and index number 1, the pair of comparison event type 6 and index number 2, and the pair of comparison event type 7 and index number 1. The external block 150 activates the transmission start/completion flag when starting the data transmission to the microprocessor 110, and negates the flag when completing the data transmission. In response to this, the event signal generator 111 generates a signal that represents event type 4 upon activation of the transmission start/completion flag, and a signal that represents event type 5 upon negation of the flag.

The operation illustrated in FIG. 10 realizes the following power control according to the type of an event occurring in the microprocessor 110. First, when starting the data transmission from the external block 150 to the microprocessor 110, the transmission start/completion flag is activated, in response to which the event signal generator 111 generates a signal that represents event type 4, whereby the type of an event that has occurred matches the fourth comparison event type in the event table 131. Therefore, an index signal representing number 3 is supplied to the power table 120. Upon receipt of the index signal, the power table 120 supplies power control information that is specified by index number 3 to the voltage/clock controller 140, and the voltage/clock controller 140 performs a power control and a clock control according to the power control information. At this time, it is possible to, for example, increase the power supply voltage Vcc supplied to the receiving process block 115 while also increasing the frequency of the clock to be supplied to the block 115. Then, upon completion of the data transmission from the external block 150 to the microprocessor 110, the transmission start/completion flag is negated, in response to which the event signal generator 111 generates a signal that represents event type 5, whereby the type of an event that has occurred matches the fifth comparison event type in the event table 131. Therefore, an index signal representing number 1 is supplied to the power table 120.

Upon receipt of the index signal, the power table 120 supplies power control information that is specified by index number 1 to the voltage/clock controller 140, and the voltage/clock controller 140 performs a power control and a clock control according to the power control information. At this time, it is possible to, for example, block the power supply voltage to the receiving process block 115 while terminating the supply of the clock to the block 115. In this way, the receiving process block 115 can be operated at a high speed only when it is necessary.

As described above, with the power control device of FIG. 8, the user is allowed to rewrite the power table 120 and the event table 131 as desired so as to finely define the low power mode operation of the microprocessor 110 according to events that occur asynchronously with an application program. Moreover, it is not necessary to execute a special instruction for such a power control, whereby the power control will not reduce the processing efficiency of an application program itself or increase the instruction memory capacity. Furthermore, with the power control device of FIG. 8, an application program can be developed independently of the power control design. Therefore, it is possible to improve the program development efficiency and the maintainability. Moreover, it is possible to realize a detailed power control without modifying the existing application programs.

Third Embodiment

Figure 11:
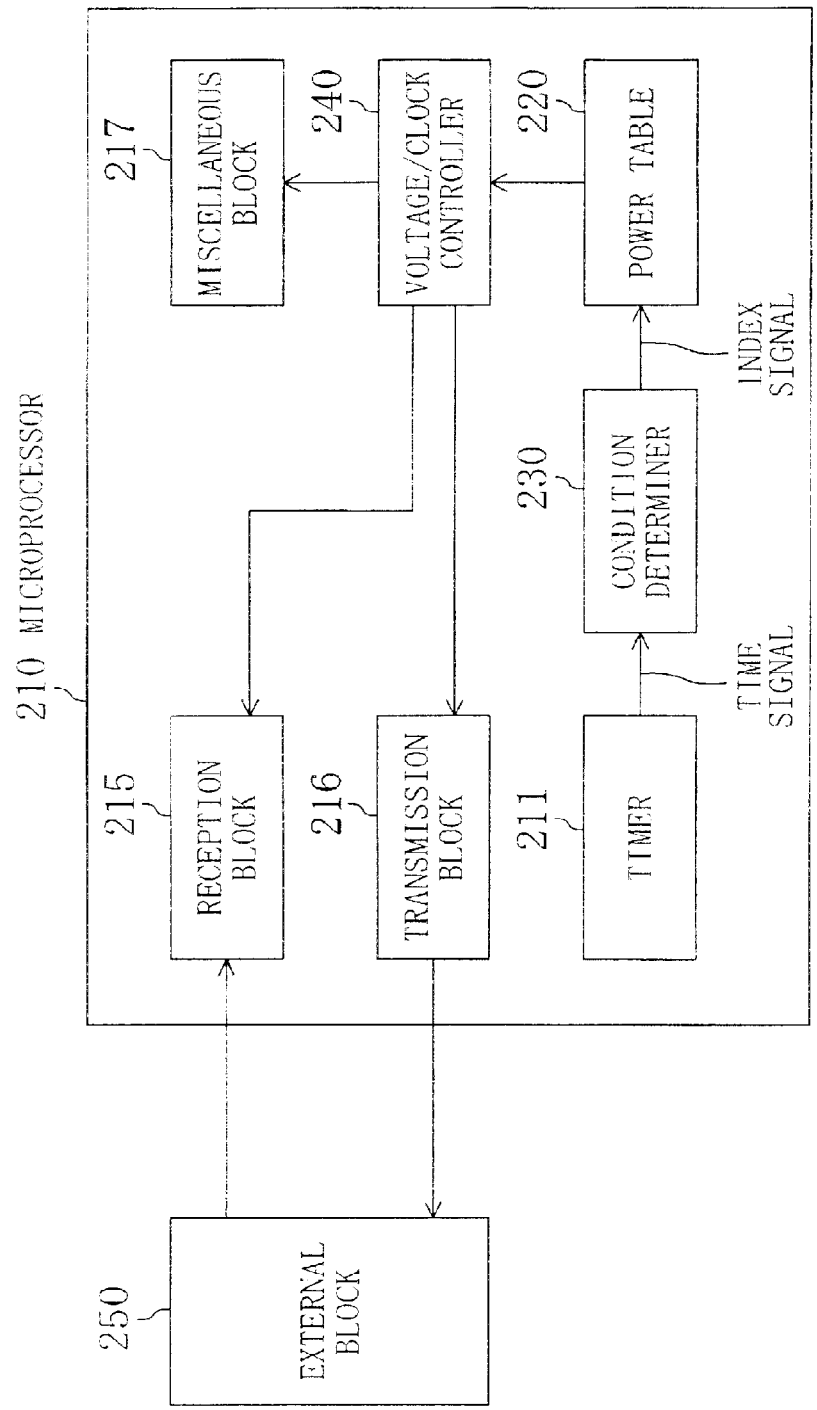
FIG. 11 is a block diagram illustrating a microprocessor including a power control device according to a third embodiment of the present invention.

FIG. 11 illustrates a microprocessor 210 including a power control device according to a third embodiment of the present invention. The microprocessor 210 of FIG. 11 has a function of performing a data transmission/reception operation to/from an external block 250 in a predetermined time period. The microprocessor 210 includes a timer 211 for generating a time signal representing the time, a reception block 215 for receiving data, a transmission block 216 for transmitting data, and a miscellaneous function block 217. The microprocessor 210 of FIG. 11 further includes a power table 220 similar to the power table 20 in FIG. 1, a condition determiner 230 for supplying an index signal to the power table 220 in response to the time signal, and a voltage/clock controller 240 similar to the voltage/clock controller 40 in FIG. 1, which together form a power control device for controlling the power consumption of the circuit blocks 215, 216 and 217.

Figure 12:
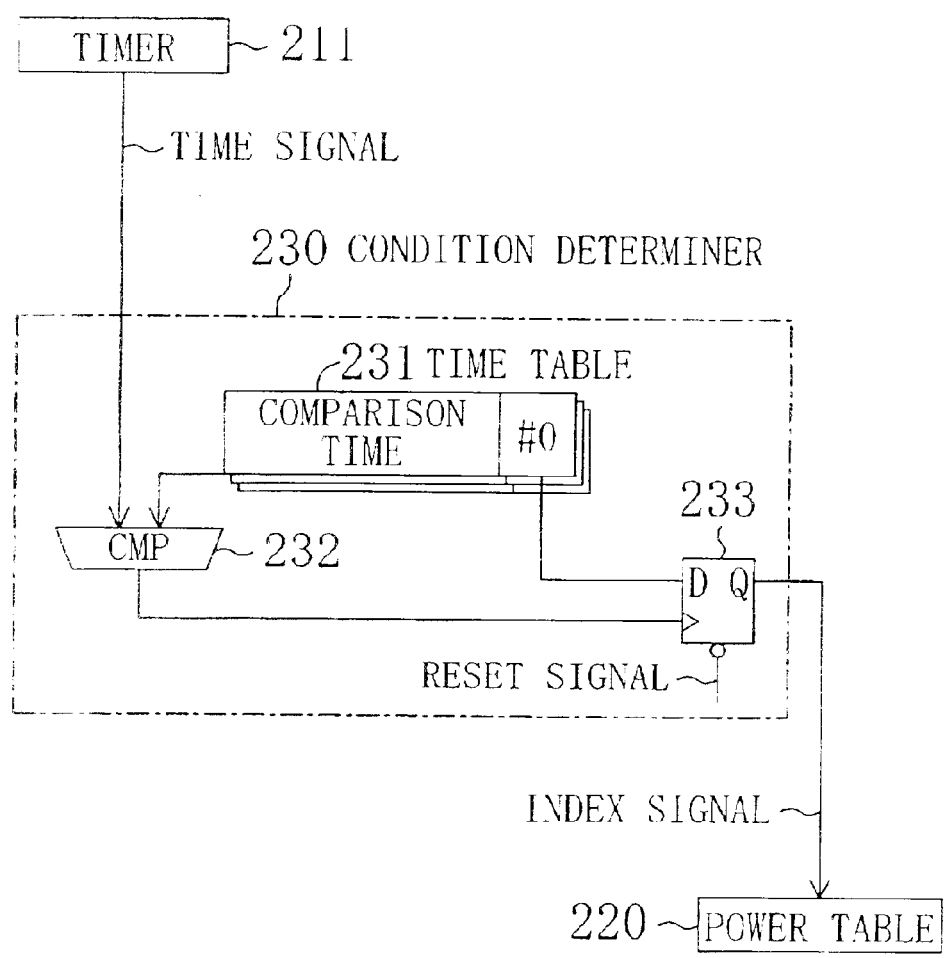
FIG. 12 is a block diagram illustrating a specific example of a condition determiner in FIG. 11.

FIG. 12 illustrates a specific example of the condition determiner 230 in FIG. 11. The condition determiner 230 of FIG. 12 includes a time table 231, a comparator 232 and a latch 233. The time table 231 includes a plurality of registers each rewritably storing a comparison time and an index number associated with the comparison time. The comparator 232 determines which one of the plurality of comparison times in the time table 231 matches the time represented by the time signal generated by the timer 211. The latch 233 holds the index number associated with the comparison time that has been determined to be a match, and supplies a signal representing the index number to the power table 220 as the index signal.

Figure 13:
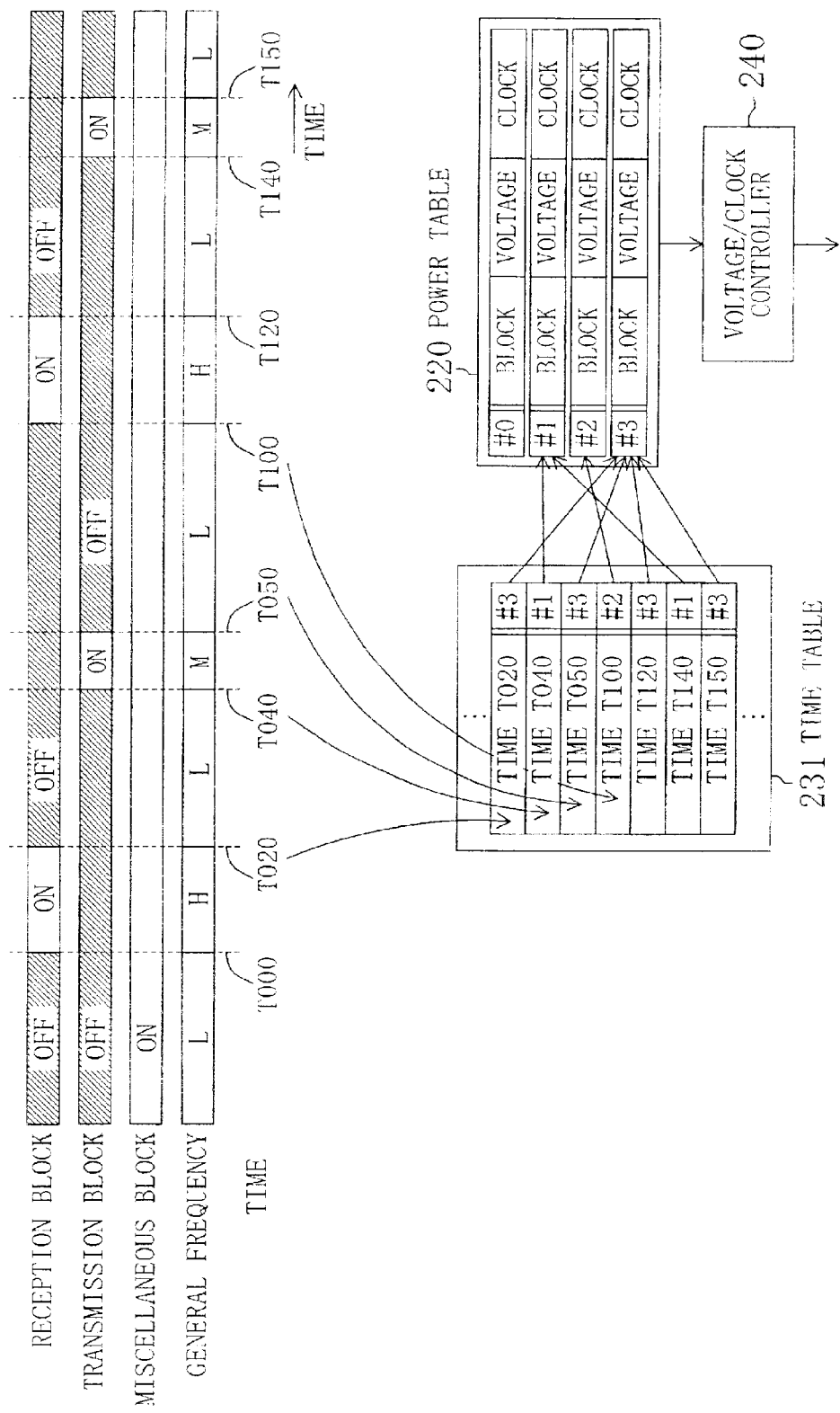
FIG. 13 is a conceptual diagram illustrating an example of an operation performed by the power control device of FIG. 11.

FIG. 13 conceptually illustrates an example of an operation performed by the power control device of FIG. 11. In FIG. 13, the power table 220 includes four power control registers that are identified by respective index numbers 0, 1, 2 and 3. The time table 231 stores many pairs of comparison time and index number. In FIG. 13, T000, T020, T040, T050, T100, T120, T140 and T150 each represent a time. Consider a case where the microprocessor 210 performs a transmission operation in a time period from T040 to T050, and a reception operation in a time period from T100 to T120.

The operation illustrated in FIG. 13 realizes the following power control according to the passage of time. First, when the time signal from the timer 211 indicates T020, the time matches comparison time T020 in the time table 231, whereby an index signal representing number 3 is supplied to the power table 220. Upon receipt of the index signal, the power table 220 supplies power control information that is specified by index number 3 to the voltage/clock controller 240, and the voltage/clock controller 240 performs a power control and a clock control according to the power control information. At this time, it is possible to, for example, terminate the supply of the power supply voltage and the clock to the reception block 215 and the transmission block 216 while lowering the general operating frequency of the microprocessor 210. In this way, the power consumption can be reduced for the processor as a whole. Then, when the time signal from the timer 211 indicates T040, the time matches comparison time T040 in the time table 231, whereby an index signal representing number 1 is supplied to the power table 220. Upon receipt of the index signal, the power table 220 supplies power control information that is specified by index number 1 to the voltage/clock controller 240, and the voltage/clock controller 240 performs a power control and a clock control according to the power control information. At this time, it is possible to, for example, start supplying the power supply voltage and the clock to the transmission block 216 while terminating the supply of the power supply voltage and the clock to the reception block 215 and to increase the general operating frequency of the microprocessor 210 to a medium level. Then, when the time signal from the timer 211 indicates T050, the time matches comparison time T050 in the time table 231, whereby an index signal representing number 3 is again supplied to the power table 220, thus returning to the state in the time period from T020 to T040. Then, when the time signal from the timer 211 indicates T100, the time matches comparison time T100 in the time table 231, whereby an index signal representing number 2 is supplied to the power table 220. Upon receipt of the index signal, the power table 220 supplies power control information that is specified by index number 2 to the voltage/clock controller 240, and the voltage/clock controller 240 performs a power control and a clock control according to the power control information. At this time, it is possible to, for example, start supplying the power supply voltage and the clock to the reception block 215 while terminating the supply of the power supply voltage and the clock to the transmission block 216 and to increase the general operating frequency of the microprocessor 210 to the maximum level.

As described above, with the power control device of FIG. 11, the user is allowed to rewrite the power table 220 and the time table 231 as desired so as to finely define the low power mode operation of the microprocessor 210 according to the passage of time. Moreover, it is not necessary to execute a special instruction for such a power control, whereby the power control will not reduce the processing efficiency of an application program itself or increase the instruction memory capacity. Furthermore, with the power control device of FIG. 11, an application program can be developed independently of the power control design. Therefore, it is possible to improve the program development efficiency and the maintainability. Moreover, it is possible to realize a detailed power control without modifying the existing application programs. The number of registers in the time table 231 can be reduced by periodically resetting the timer 211.

Figure 14:
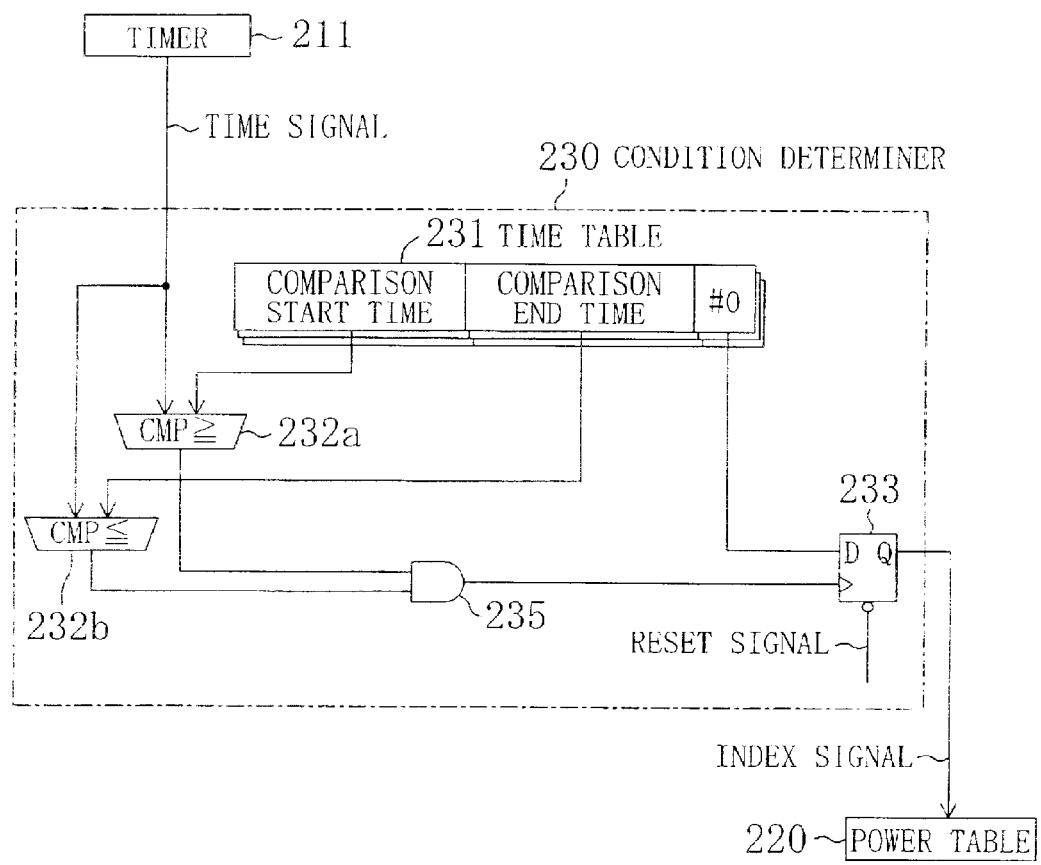
FIG. 14 is a block diagram illustrating a variation of the condition determiner in FIG. 11.

FIG. 14 illustrates a variation of the condition determiner 230 in FIG. 11. The time table 231 of the condition determiner 230 of FIG. 14 includes a plurality of registers each rewritably storing a comparison start time, a comparison end time associated with the comparison start time, and an index number associated with the comparison start time and the comparison end time. The condition determiner 230 determines one of a plurality of time periods each defined by one of the comparison start times and one of the comparison end times to which the time indicated by the time signal from the timer 211 belongs to, and outputs, to the power table 220 as an index signal, a signal representing the index number that is associated with the comparison start time and the comparison end time defining the time period that has been determined to include the indicated time. For such an operation, the condition determiner 230 of FIG. 14 includes a first comparator 232a, a second comparator 232b, an AND gate 235 and a latch 233, in addition to the time table 231. A time period determination over a greater period of time than that in the case of FIG. 14 can be realized by performing a match determination at the comparator 232 in FIG. 12 with only one or more upper bits of the time signal.

Each of the embodiments described above can be modified in various ways. For example, in the configuration of FIG. 1, the power table 20 and the address table 31 may be integrated together into a single device for some particular applications. While each of the power control registers 21 in FIG. 2 includes five fields, the number of fields is not limited to this. For example, each of the power control registers 21 may include only a field for the power supply voltage Vcc for some particular applications.

Each of the tables described above is not limited to a flip flop or a latch, but may alternatively be a programmable logic such as a RAM, an EEPROM or an FPGA. Each table may be rewritable through execution of an instruction. A plurality of power tables may be provided.

The index signal to be supplied to each power table may be updated through execution of an instruction. For example, the index number of a power table can be specified by the operand portion of a branch instruction such as a subroutine call instruction.

The input to the condition determiner may be an instruction code or data that is handled by the microprocessor. A power supply voltage control may be performed by detecting, with a condition determiner, writing/reading of data to/from a particular memory space (e.g., the space of a flash memory).

A power control can be performed by combining the embodiments described above with one another. For example, the power supply voltage can be reduced only when a particular subroutine is being executed based on address comparison, while the clock frequency is increased in response to an external event.

What is claimed is:

1. A power control device for controlling an amount of power to be consumed in a processor, the power control device comprising:

a power table including a plurality of power control registers each rewritably storing power control information;

a condition determiner for rewritably storing a plurality of operating conditions and determining which one of the plurality of operating conditions is satisfied by a current operation of the processor so as to supply an index signal to select one of the plurality of power control registers based on the determination; and a controller for controlling a power consumption in the processor according to the power control information in one of the power control registers that is selected by the index signal.

2. The power control device of claim 1, wherein the power control information includes block information for specifying one or more circuit block to be subjected to a power control by the controller.

3. The power control device of claim 1, wherein the power control information includes voltage information representing a magnitude of a power supply voltage to be supplied to a control object circuit block.

4. The power control device of claim 1, wherein the power control information includes voltage information for controlling a threshold voltage of each transistor of a control object circuit block.

5. The power control device of claim 1, wherein the power control information includes clock information representing a frequency of a clock to be supplied to a control object circuit block.

6. The power control device of claim 1, wherein the power control information includes clock information representing whether or not to terminate a supply of a clock to a control object circuit block.

7. The power control device of claim 1, wherein the condition determiner includes:

an address table including a plurality of register means each rewritably storing a comparison address and an index number associated with the comparison address;

means for determining which one of the plurality of comparison addresses matches an address indicated by a program counter of the processor; and means for supplying, to the power table as the index signal, a signal representing an index number associated with the comparison address that has been determined to be a match.

8. The power control device of claim 7, wherein the condition determiner further includes means for performing a control so that the match determination is performed only when a discontinuous change is detected in the address indicated by the program counter.

9. The power control device of claim 1, wherein the condition determiner includes:

an address table including a plurality of register means each rewritably storing a comparison start address, a comparison end address associated with the comparison start address, and an index number associated with the comparison start address and the comparison end address;

means for determining one of a plurality of address ranges each defined by one of the comparison start addresses and one of the comparison end addresses to which an address indicated by a program counter of the processor belongs to; and means for supplying, to the power table as the index signal, a signal representing an index number associated with the comparison start address and the comparison end address defining the address range that has been determined to include the indicated address.

10. The power control device of claim 1, wherein the condition determiner includes:

an event table including a plurality of register means each rewritably storing a comparison event type and an index number associated with the comparison event type;

means for determining which one of the plurality of comparison event types matches a type of an event that has occurred in the processor; and means for supplying, to the power table as the index signal, a signal representing an index number associated with the comparison event type that has been determined to be a match.

11. The power control device of claim 1, wherein the condition determiner includes:

a time table including a plurality of register means each rewritably storing a comparison time and an index number associated with the comparison time;

means for determining which one of the plurality of comparison times matches a time indicated by a time signal from the processor; and means for supplying, to the power table as the index signal, a signal representing an index number associated with the comparison time that has been determined to be a match.

12. The power control device of claim 1, wherein the condition determiner includes:

a time table including a plurality of register means each rewritably storing a comparison start time, a comparison end time associated with the comparison start time, and an index number associated with the comparison start time and the comparison end time;

means for determining one of a plurality of time periods each defined by one of the comparison start times and one of the comparison end times to which a time indicated by a time signal from the processor belongs to; and means for supplying, to the power table as the index signal, a signal representing an index number associated with the comparison start time and the comparison end time defining the time period that has been determined to include the indicated time.

* * * * *